United States Patent
Hamilton et al.

[11] Patent Number: 5,820,344
[45] Date of Patent: Oct. 13, 1998

[54] CONTOURED FLEXURE STRAP FOR HELICOPTER ROTOR SYSTEM

[75] Inventors: Brian K. Hamilton; Stephen L. Guymon; Murray J. Hines, all of Mesa; Thu N. Vu, Tempe, all of Ariz.

[73] Assignee: McDonnell Douglas Corporation, St. Louis, Mo.

[21] Appl. No.: 884,386

[22] Filed: Jun. 27, 1997

[51] Int. Cl.$^6$ ...................................... F04D 29/36
[52] U.S. Cl. ...................... 416/134 A; 416/135; 416/136
[58] Field of Search .................. 416/134 A, 135, 416/138, 136, 140, 141

[56] References Cited

U.S. PATENT DOCUMENTS

| 4,427,340 | 1/1984 | Metzger et al. | 416/141 |
| 4,650,401 | 3/1987 | Yao et al. | 416/134 |

Primary Examiner—John T. Kwon
Attorney, Agent, or Firm—Robert Westerlund

[57] ABSTRACT

The present invention relates to an improved helicopter rotor system including a contoured flexure strap having a simplified geometrical configuration. The flexure strap serves to join the rotary hub assembly with the rotor blades and is formed of fiberglass. The primary load carrying fibers of the flexure strap preferably extend in the same direction as the spanwise axis of the flexure strap in order to withstand the centrifugal forces acting on the strap. The inboard end portion of the flexure strap includes two separate ends, with one of the ends extending in a vertically upward direction and the other end in a vertically downward direction. This allows the ends of flexure straps positioned on opposite sides of the rotary hub assembly to overlap one another and be retained in place by a single pin and bolt assembly. A cloth wrap of composite matrix material surrounds portions of the flexure strap to provide redundancy which prevents the fibers in the flexure strap from delamination when subjected to forces arising during operation of the helicopter.

20 Claims, 3 Drawing Sheets

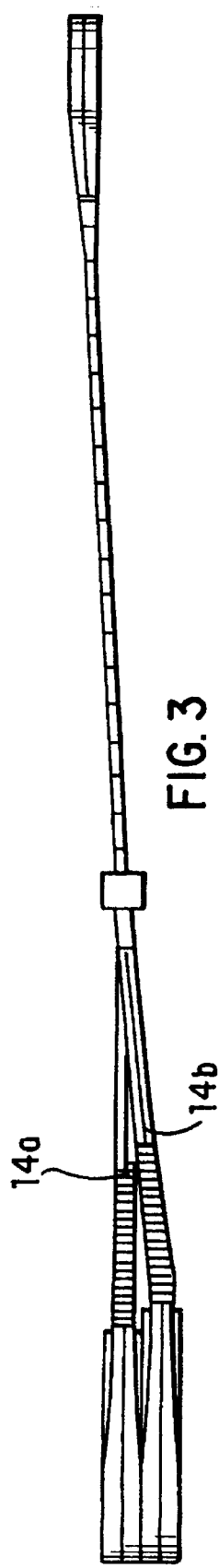
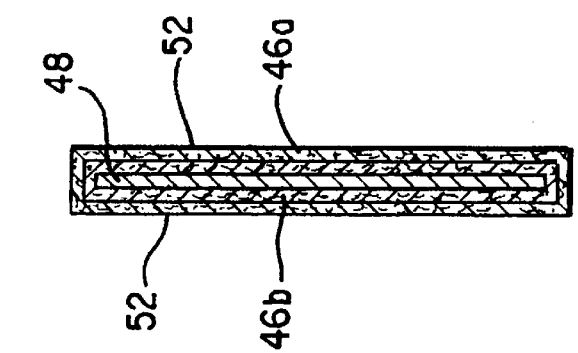
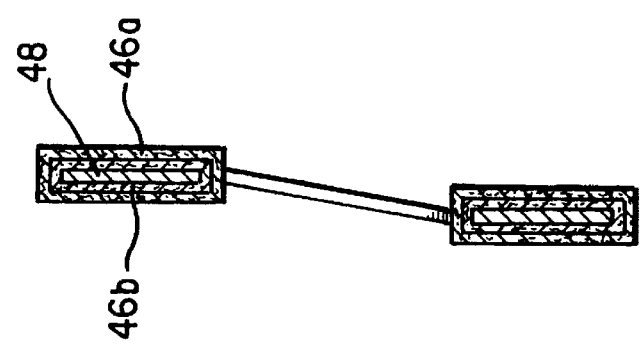

CONTOURED FLEXURE STRAP FOR HELICOPTER ROTOR SYSTEM

BACKGROUND OF THE INVENTION

The present invention relates to the field of helicopter rotor systems. In particular, the invention relates to an improved rotor system including a unique flexure strap joining the rotor blade to the rotor hub.

The flight control characteristics of a helicopter are dictated to a great extent by the rotor system employed. Rotor systems include a rotor hub assembly which provides a mechanical coupling between a drive shaft and a plurality of rotor blades which provide the operative rotating airfoils. The rotor hub assembly may include articulated bearing assemblies or flexure members. A control mechanism is employed for controlling the attitude of the blades in flight. Performance of the rotor system as a whole is only as good as the performance of any one of the components discussed above.

It is well known to employ inboard bearings, such as taught in U.S. Pat. No. 4,257,739, to provide soft, inplane operation while accommodating pitch change.

In an effort to improve performance while reducing both the cost of the rotor system and its maintenance, it has been suggested that the inboard bearings can be replaced with a bearingless rotor system, wherein a unitary yoke assembly consisting of a flat hub is anchored to the end of a helicopter's rotary mast. The hub includes a number of integrally formed supporting arms, with each arm extending from the hub into engagement with one of the blades. Such an integrally formed hub and arm assembly is disclosed in U.S. Pat. No. 4,427,340 (hereinafter '340). Alternatively, U.S. Pat. No. 4,650,401 (hereinafter '401) issued Mar. 17, 1987, assigned to the assignee of the present invention and incorporated by reference hereto, teaches the use of a plurality of separate flexure straps, wherein each strap has one end connected to a central hub and an opposite end connected to a rotor blade.

Whether or not flexure straps and the hub are integrally joined, primary functions of the flexure strap are to simultaneously carry the blade centrifugal forces to the hub and to allow the required rotor blade motions without exceeding the allowable stresses in the composite material forming the flexure strap. It is desirable to minimize the overall length of the flexure strap while still achieving satisfactory blade flap and lead-lag hinge offsets. This provides suitable dynamic properties and sufficient lead-lag motion of the snubber/damper for satisfactory dynamic response to cyclic loads. Rotor blade flapping, lead-lag and feathering motions act in combination with blade and pitch case centrifugal forces to cause deformations of the flexure strap. The flexure strap must therefore be designed to withstand these deformations. Because rotor blade motions have both steady and cyclic components, fatigue loads dominate, making fatigue strength of the composite material a critical design factor. The criteria for blade motions include both static droop and start-up torque conditions. In addition, a displacement constraint must be imposed on damper motion to satisfy the dynamic requirements of the rotor system. These goals need to be considered in tailoring the shape and performance of the flexure strap to meet flight requirements of the helicopter.

In known prior art rotor systems there has been no effort to tailor the stiffness of the flexure strap over its spanwise length in order to achieve proper flap, chord and torsional stiffness distribution. Known flexure straps are constructed of fiber/matrix composite material including high strength fibers which carry the blade centrifugal force, while the flexibility of the strap is achieved by employing a strap with a relatively complicated cross sectional geometry. Note the "H-shaped" configuration of the rib shaped members 40, 42, 44 and 46 employed in the '340 patent flexure strap and the "X-shaped" configuration of the ribs in the '401 patent. The complicated geometry of these flexure members is difficult, costly and time consuming to fabricate to the necessary high degree of tolerance. More importantly, known flexure straps do not include any built-in redundancy to the matrix system and thus are much more likely to fail when subjected to dynamic loads which can cause delamination of the strap as compared to the unique rotary hub flexure strap constructed in accordance with the present invention.

Based on the above and foregoing, it can be appreciated that there presently exists a need in the art for a rotor system including a flexure strap having minimal length and simple geometry and yet capable of facilitating rotor blade motions without exceeding the allowable stresses in the composite material forming the flexure strap. The successful solution must be able to satisfy the dynamic requirements of the helicopter without undue cost and excessive maintenance.

SUMMARY OF THE INVENTION

The present invention encompasses an improved rotor system including a contoured flexure strap having a simplified geometrical cross sectional configuration. A separate cloth wrap formed of composite material surrounds portions of the flexure strap to provide redundancy to the matrix system used in constructing the flexure strap. In particular, the cloth prevents the fiberglass matrix from delaminating when subjected to operational forces occurring during helicopter performance.

The contoured flexure strap is preferably made from fiberglass strengthened to handle greater mechanical loads. S2-Glass with an epoxy matrix available from ICI FIBERITE has been found satisfactory for use in forming the flexure straps used in the MD 900 series helicopters. It should be understood that the particular fiberglass composite chosen is considered a design choice based on the particular physical and performance characteristics of the particular helicopter. The primary load carrying fibers preferably extend in the same direction, i.e. they are unidirectional, and form an angle of substantially zero degrees (0°) with the spanwise axis of the flexure strap. The fibers loop around a pair of bushings positioned at each end of the flexure strap for receiving through pins joining the flexure strap at one end to the rotor hub and at the opposite end to a rotor blade.

Each flexure strap has a flattened, rectangular cross-sectional configuration consisting of upper and lower halves of equal size and shape. Each half is made of fibers, wherein approximately 90% of the fibers form an angle of zero degrees (0°) with the spanwise axis and the remaining 10% of the fibers form an angle of plus/minus forty five degrees (±45°) with the spanwise axis. The two equal halves are separated by a center web of glass fibers which form an angle of either plus/minus forty five degrees (+45°) or ninety degrees (90°) with the spanwise axis. Preferably the thickness of the center web does not exceed 15% of the total cross sectional thickness of the flexure strap.

The flexure strap includes inboard and outboard end portions and an elongated mid portion. The inboard end portion comprises two, separate inboard ends, with each end having a rectangular configuration and joined side-by-side to the elongated mid portion. As the two inboard ends extend from the elongated mid portion, they also extend away from each another in both vertical and horizontal directions. A center web of reinforcing fiberglass extends between spaced apart portions of the inboard ends to strengthen the flexure strap. Each inboard end includes a bushing for receiving a steel retaining pin joining the inboard end to the rotary hub assembly. Fibers extend around each inboard end bushing in such a manner as to create a generally triangularly-shaped area which is preferably filled with highly compressive adhesive, i.e., such as precured E-Glass laminate. One of the inboard end extends vertically above the spanwise axis of the flexure strap, while the other inboard end portion extends vertically below the spanwise axis. Inboard ends of remotely, i.e., oppositely, positioned flexure straps overlap one another, allowing a single steel connecting pin to join inboard ends of remote flexure straps to one another and to the hub assembly. Each of the inboard ends is further reinforced by a center web of fiber plies extending plus/minus forty five degrees (45°) or ninety degrees (90°) along the spanwise axis of inboard end.

The outboard end portion of the flexure strap is integrally formed with the mid portion and extends outwardly from the hub assembly. The outboard end portion is contoured in both size and thickness as to form a thickened, wedge-shaped member capable of accommodating two bushings. Each bushing extends completely through the outboard end portion in order to receive a retaining pin joining a rotor blade to the flexure strap.

The elongated mid portion of the flexure strap is formed with a rectangular cross-sectional configuration and, preferably is completely wrapped in a cloth of fiberglass epoxy matrix material which has been electrically strengthened, e.g., such as that which is available from ICI FIBERITE and designated as E-Glass. The E-Glass extends in a direction substantially perpendicular to the spanwise axis of the mid portion. Because the cloth is wrapped across the spanwise axis of the flexure strap, it introduces a degree of redundancy than reduces the need of the matrix of the mid portion to be strictly formed with a unidirectional fiber orientation. While E-Glass wrapping cloth is preferred for meeting strength requirements in the most cost effective manner, it is within the scope of the present invention to substitute any other suitable composite matrix material for the E-Glass.

Each of the inboard ends is also partially wrapped in a fiberglass cloth in order to the tendency of the inboard ends from delaminating during helicopter performance.

The width, thickness and cross-sectional area of the flexure strap varies along the spanwise axis in a way which is designed to minimize the critical shear and normal stresses induced by the rotor centrifugal force and the blade steady and cyclic flap, feather, and lead-lag motion. The cross-sectional area of the flexure strap itself as well as the area of its terminal lugs is increased by interleaving additional plies of fiberglass composite material. The additional plies terminate in random fashion to minimize interlaminar shear stresses. As will become clear, the outboard and inboard end portions are thicker than the elongated mid portion and the outboard end portion is wider than the elongated mid portion. This maximizes the thickness of the flexure strap as needed to prevent structural failure of the part.

A separate, hollow pitch case surrounds each of the flexure straps and is joined at opposite ends with the rotary hub and one of the blades. The pitch case is constructed to transfer the majority of the blade torsional loads to the helicopter control system. The inputs from the rotor control system are transmitted through the pitch case to the blades.

While the present invention is discussed in terms of a five (5)-bladed rotary system, it is within the scope of the present invention to utilize the rotary system flexure strap with any suitable rotor system, e.g., three (3), four (4) and six (6)-bladed rotor systems.

BRIEF DESCRIPTION OF THE DRAWINGS

These and various other features and advantages of the present invention will be readily understood with reference to the following detailed description read in conjunction with the attached drawings, in which:

FIG. 3 is a side view of the flexure strap of FIG. 2; and

FIGS. 4a–4d are sectional views taken at various intervals along the flexure strap shown in FIG. 2.

DETAILED DESCRIPTION OF THE INVENTION

Figure 1:
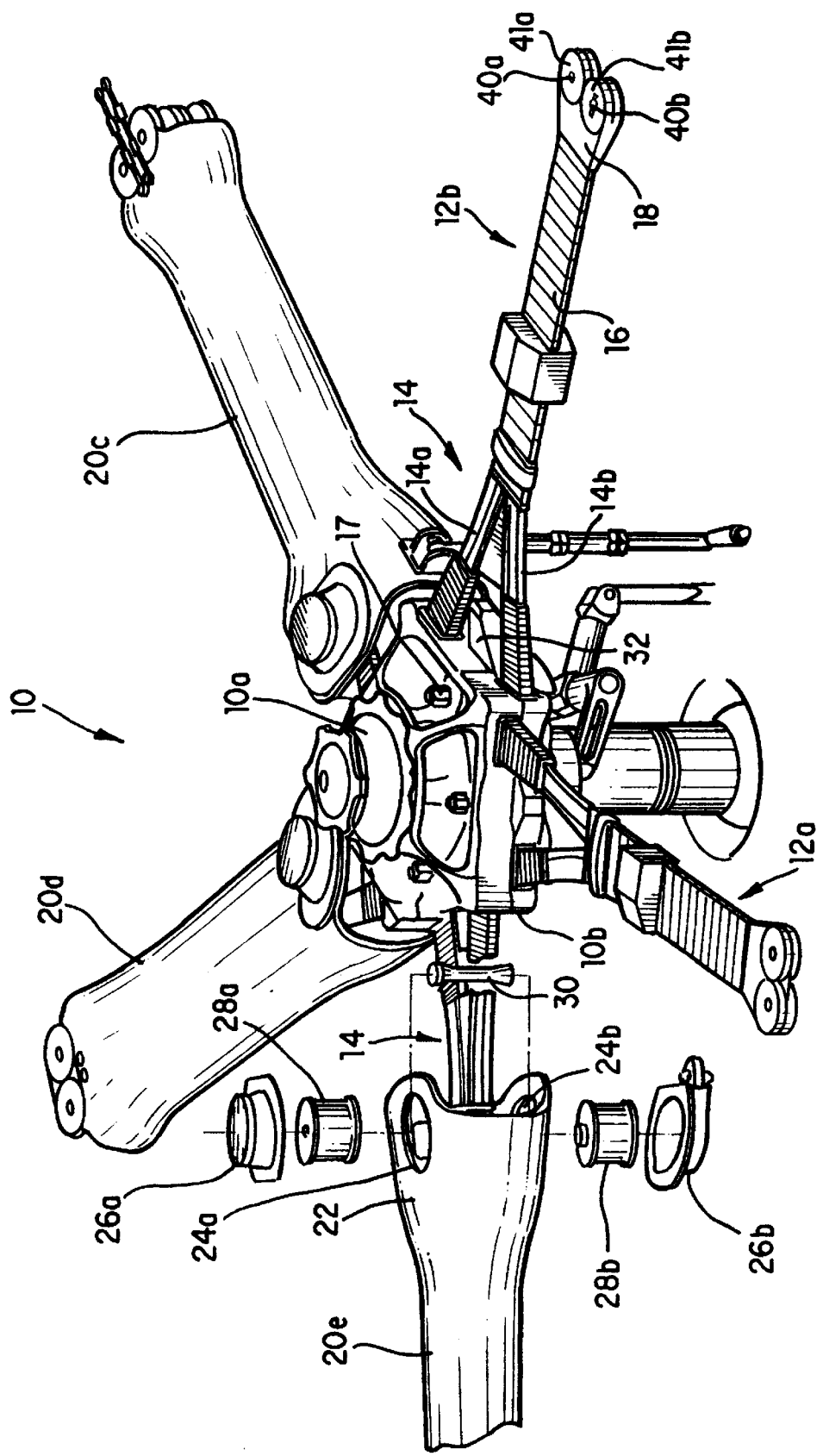
FIG. 1 is a partially-exploded perspective view of a helicopter rotor system having a flexure strap constructed in accordance with the present invention.

The present invention provides a helicopter rotary system including a uniquely contoured flexure strap connecting the helicopter rotary hub with the rotor blades. Referring now to FIG. 1, the hub assembly for a five (5)-bladed helicopter rotary system constructed in accordance with the present invention is designated generally by the numeral 10. Hub assembly 10 includes upper hub 10a and lower hub 10b. Two flexure straps 12a and 12b are shown in whole, while only an inboard end portion 14 of a third flexure strap 12e is shown. It is to be understood that the remaining two flexure straps, not visible in FIG. 1, are similar in shape and construction to flexure straps 12a and 12b.

As will be discussed below, flexure straps 12a–12e are identical and each flexure strap includes an inboard and outboard end portions 14 and 18, respectively, and an elongated mid portion 16. Each outboard end portion 18 is wedge shaped and is connectable to a rotary blade, not visible in FIG. 1. The inboard end portion 14 of each of the flexure straps 12a–12e is divided into two rectangularly-shaped ends 14a and 14b, respectively. Ends 14a and 14b are spaced from each other such that as end 14a extends toward hub assembly 10 it rises in a vertically upwardly direction above the spanwise axis of flexure strap 12. Likewise, as end 14b extends toward hub assembly 10, it projects below the spanwise axis of flexure strap 12. Finally, inboard ends 14a and 14b of each flexure strap 12 extend away from each other along the chordwise axis as they each approach hub assembly 10.

Figure 1A:
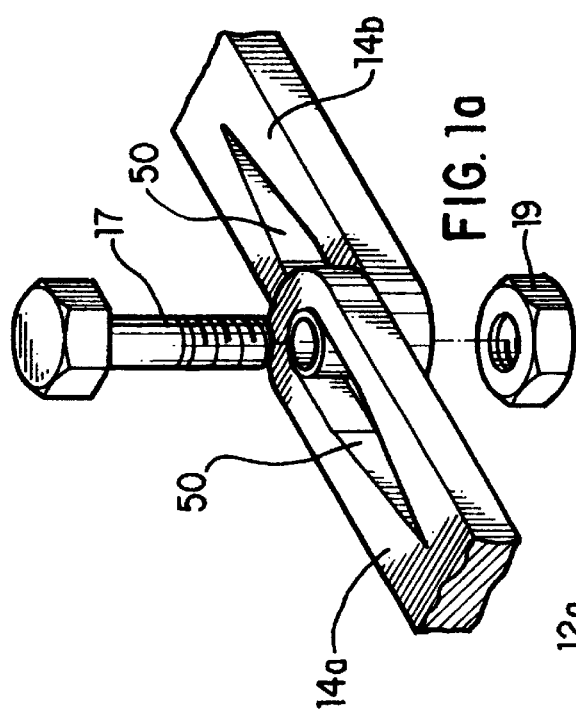
FIG. 1a is a schematic view of a portion of the rotor system of FIG. 1 showing the pin connection between remotely positioned flexure straps.

As viewed in FIG. 1a, inboard end 14a of flexure strap 12a overlaps the inboard end 14b of remotely positioned flexure strap 12c. This allows a single connecting pin 17 to pass through aligned openings 42a and 42b extending through the overlapping ends 14a and 14b. The connecting pin 17 and bolt 19 connects overlapping inboard ends 14a and 14b of remotely positioned flexure straps 12a and 12c to each other as well as to hub assembly 10. In a similar manner, the inboard end 14a of each flexure strap is positioned to overlap the inboard end 14b of a remotely positioned flexure strap, wherein a single connecting pin 17 and bolt 19 is able to join overlapping inboard ends of separate flexure straps to hub assembly 10.

A separate, hollow pitch case 20a–20e surrounds each of the respective flexure straps 12a–12e, wherein each pitch case 20 is constructed of lightweight, composite material. Each pitch case 20a–20e includes an inboard end portion 22 having top and bottom vertically aligned openings 24a and 24b, respectively. A separate, upper damper cap 26a covers each opening 24a. In a similar manner a separate, lower damper cap 26b covers each opening 24b. A pair of elastomeric dampers 28a and 28b extend within the openings 24a and 24b, respectively, wherein each damper 28a and 28b includes an outer end portion contacting one of the caps 26a and 26b, respectively.

A snubber in the form of a centering bearing 30 extends vertically through and is supported by a support mount 32 of hub assembly 10. Snubber bearing 30 preferably is formed of elastomeric material having opposite end portions engaging one of the dampers 28a or 28b. Dampers 28a and 28b act in shear to dampen the lead-lag motions of a rotor blade. Since each surrounding pitch case 20 is substantially stiffer than its flexure strap 12, each pitch case 20a–20e tends to align itself with a respective rotor blade, giving rise to relative motion that is damped out by dampers 28a and 28b acting with snubber bearing 30. In addition to damping lead-lag motions, the structure formed in accordance with the present invention creates two separate load paths for blade chordwise loads to transfer into hub assembly 10 One path extends through the flexure strap 12, while the other path extends though pitch case 20 and dampers 28a and 28b. A separate pitch link 34 is attached to the inboard, trailing edge of each pitch case 20a–20e via a respective pitch horn 36. Each pitch case 20a–20e transfers the majority of the blade torsional loads to the helicopter control system.

Each flexure strap 12a–12e is formed as an all composite member which joins a rotor blade and surrounding pitch case 20 to the main rotor hub assembly 10. Each flexure strap 12 retains a blade and surrounding pitch case 20 against rotor separation even when subjected to excessive centrifugal forces. Each flexure strap 12 flexes by twisting and bending to permit the rotor blade to feather, flap and undergo lead-lag motions without complex hinges and bearings as required in conventional, articulated rotor hub assemblies. In order to follow the bending and twisting motions of the rotor blade and pitch case 20, each flexure strap 12 functions as a universal joint and flexes about the flap, lag and feather axes. Because each flexure strap 12 transmits to the rotary hub assembly 10 the blade pitch case centrifugal force, each flexure strap 12 also must function as a tension bar. The amount of centrifugal force acting on each flexure strap 12 is a direct function of the masses of the various helicopter components as well as the RPM of the rotating blade and pitch case.

Flexural moments in the flexure straps 12 are generated indirectly as functions of changing motions as well as the inherent stiffness of a particular flexure strap 12. A balance must be found between strength and stiffness because the flexural moments increase with an increase in the stiffness of a flexure strap 12. In order to minimize the critical stresses, the composite material forming each flexure strap 12 must be properly distributed along the spanwise axis of the flexure strap 12.

Figure 2:
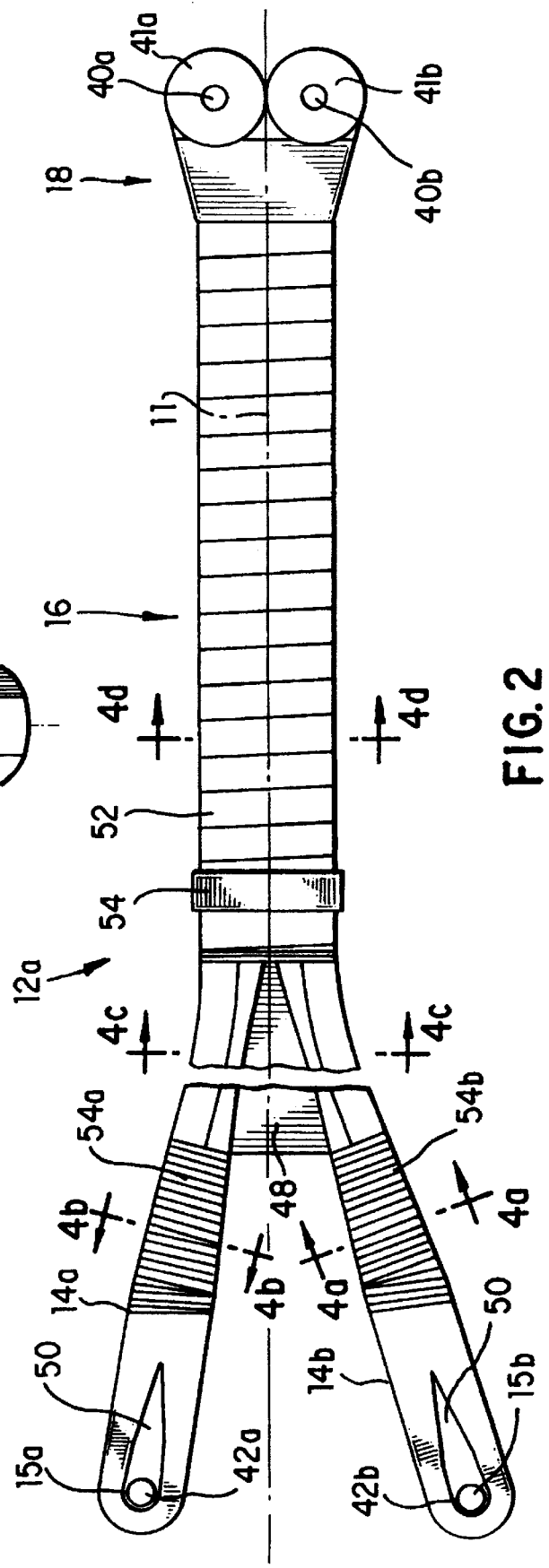
FIG. 2 is a top view of a flexure strap constructed in accordance with the present invention.

Referring now to FIGS. 2–4, a typical flexure strap 12a is shown in cross-section to appear as a somewhat flattened rectangle. Strap 12a includes an expanding, wedge-shaped outboard end portion 18 having a pair of through openings 40a and 40b. Steel bushings 41a and 41b are mounted in the openings 40a and 40b, respectively, to receive expanding pins, not visible, which join both flexure strap 12a and the outboard end of a pitch case 20 to a rotary blade, not visible. As noted in FIGS. 2 and 3, outboard end portion 18 is gradually contoured to be both wider and thicker than elongated mid portion 16 as the distance from elongated mid portion 16 increases in the spanwise direction of flexure strap 12.

Separate inboard end 14a and 14b gradually extend away from each other in both the vertical and horizontal directions as the distance increases from elongated mid portion 16, as shown in FIGS. 2, 3 and 4c. Each inboard end 14a and 14b includes a through opening designated either 42a or 42b, respectively. Steel bushings 15a and 15b are mounted in the respective the openings 42a and 42b, such that a separate connecting pin and bolt 17 and 19 may be employed to join two different flexure straps, i.e. 12a and 12c to each other and hub assembly 10.

Each flexure strap 12a–12e is of identical construction and is preferably formed of S-2 fiberglass with an epoxy matrix. The primary load carrying fibers extend substantially in the same direction as the spanwise axis of strap 12, i.e. they are substantially unidirectional, with substantially 0° misalignment with the flexure strap spanwise axis 11 as identified in FIG. 2. As shown in FIGS. 4a–4d, flexure strap 12a consists of equally constructed upper and lower rectangularly-shaped halves 46a and 46b. Each half is formed from plies of fiberglass arranged such that approximately ninety percent (90%) of the plies are aligned with the spanwise axis 11 of strap 12 and ten percent (10%) are disposed plus/minus forty five degrees (±45°) to the spanwise axis 11. Upper and lower halves 46a and 46b are separated by a center web 48 of fiberglass wherein some of the fibers form an angle which extends plus/minus forty five degrees (±45°) and the remainder of which form an angle of ninety degrees (90°) with the span wise axis 11. The fibers comprising center web 48 preferably do not exceed fifteen percent (15%) of the total sectional thickness of upper and lower halves 46a, 46b and center web 48. As noted in FIG. 2, center web 48 extends beyond elongated mid portion 16 and between inboard ends 14a and 14b in order to strengthen flexure strap 12a.

The fiberglass plies extending substantially in the direction of the spanwise axis 11 (with substantially 0° misalignment) are looped to pass around each of the four bushings 41a, 41b and 15a, 15b mounted in either the outboard or inboard end portions 18 or 14 of flexure strap 12a. In addition, reinforcing plies made from E-Glass cloth as well as S-2Glass tows are preferably wrapped about each of the bushings. The lugs formed by the loops at each end of flexure strap 12 are of the same construction as the remainder of flexure strap 12a but are augmented by additional reinforcing plies extending either in the direction of the spanwise axis 11 or at an angle of plus/minus forty five degrees (±45°) relative to the spanwise axis 11 to provide the total required lug cross-sectional area. In passing fibers around the bushings through which the connecting pins extend, the fibers and bushings create a generally triangular area 50 in each inboard end 14a and 14b, respectively. Preferably, each triangular area 50 is filled with highly compressive adhesive, for example, precured E-Glass laminate. Lugs mounted in the inboard end bushings, not visible, are constrained by the top and bottom portions 10a and 10b of the rotary hub assembly 10. Lugs mounted in the bushings 41a and 41b mounted on the outboard end 18 are constrained by conventional bushing flanges.

The elongated mid portion 16 of each flexure strap 12a–12e is wrapped in a layer of E-Glass cloth 52 which introduces redundancy to the composite matrix. The plies of cloth 52 extend substantially perpendicular, i.e. 90°, to the spanwise axis 11 of strap 12. The cloth 52 holds flexure strap 12 together in case of matrix failure, i.e. delamination of the various layers of fiberglass composite material. Cloth wrap 52 ensures that the fibers forming elongated mid portion 16 remain properly aligned at substantially 0° to the spanwise axis 11 even if elongated mid portion 16 should undergo delamination. Additional lengths of E-Glass cloth 54a and 54b are wrapped about portions of each of the inboard ends 14a and 14b to provide additional strength to the inboard end portion 14 of each flexure strap 12a–12e.

The rectangular cross-section of each flexure strap 12 is at substantially zero degrees (0°) orientation with respect to the mast azimuth plane. However, inboard ends 14a and 14b are vertically offset from each other in order to fit into overlapping positions within hub assembly 10 This means that only five (5) bolts are required to retain five (5) flexure straps 12a–12e within hub assembly 10. At the point where each strap 12 exits from hub assembly 10, each flexure strap 12 is preferably preconed three degrees (3°) upward to approximate the mean cone angle during cruise operation of the MD 900 series helicopters. Of course, the particular degree of precone is dependent on the particular helicopter, and is not limiting to the present invention.

The stiffness of each flexure strap 12 in bending and torsion is designed in conjunction with the stiffness of the pitch case/ snubber-damper to prevent system natural vibration frequencies coincident with the rotor blade rotational frequency. To prevent the flexure straps 12a–12e from vibrating excessively compared to their respective pitch cases 20a–20e, a separate bumper 54 is preferably mounted on the elongated mid portion 16 of each flexure strap 12a–12e.

The present invention differs from the known prior art hub assemblies by incorporating a unique flexure strap that is contoured from a relatively thin mid portion to wider, thicker inboard and outboard end portions to minimize the critical shear and normal stresses induced by the rotor centrifugal forces and the blade steady and cyclic flap, feather and lead-leg motions. Each flexure strap 12a–12e has an elongated mid portion 12 with a unique, rectangular configuration which is much easier to manufacture than the complex H and X-shaped rib members employed in known flexure straps. The use of E-Glass wrapping cloth introduces a degree of affordable redundancy which prevents delamination of the fibers forming the flexure strap, regardless of their orientation. This results in increased static strength and fatigue life for each flexure strap 12.

The unique cloth wrap 52 and technique of application described in the present invention can be used on flexure straps 12 with other than rectangular cross sections. For example, flexure straps having cross-sections that are circular, elliptical, triangular, square or have other geometrical shapes will exhibit enhanced static strength and fatigue resistance if wrapped in E-Glass wrapping cloth in accordance with the present invention.

Although various embodiments of the present invention have been described in detail hereinabove, it should be clearly understood that many variations and/or modifications of the basic inventive concepts herein taught which may appear to those skilled in the pertinent art will still fall within the spirit and scope of the present invention as defined in the appended claims.

What is claimed is:

1. A flexure strap for joining a helicopter rotor blade to a helicopter rotary hub assembly, even when the blades are subjected to centrifugal forces and blade feathering, comprising:

a strap member having an inboard end portion connected to the rotary hub assembly, an outboard end portion connected to the rotor blade, and an elongated mid portion extending between and joining the inboard and outboard end portions, the flexure strap being formed of a composite matrix material having a first group of fibers which extend parallel to the spanwise axis of the strap member and having a second group of fibers which extend at an angle to the spanwise axis of the strap member; and means mounted on the flexure strap for preventing delamination of the fibers as the strap member is subjected to centrifugal forces and cyclic motions during operation of the helicopter.

2. The flexure strap according to claim 1, wherein the elongated mid portion has a rectangular cross-sectional configuration.

3. The flexure strap according to claim 2, wherein the elongated mid portion includes similarly-shaped upper and lower halves separated by a center web portion.

4. The flexure strap according to claim 3, wherein each of the upper and lower halves is constructed of fibers wherein substantially ninety percent (90%) of the fibers extend parallel to the spanwise axis of the flexure strap, and substantially ten percent (10%) of the fibers extend plus/minus forty five degrees (±45°) relative to the spanwise axis of the flexure strap.

5. The flexure strap according to claim 4, wherein the center web is constructed of fibers wherein some of the fibers extend substantially plus/minus forty five degrees (±45°) relative to the direction of the spanwise axis and the remaining fibers extend substantially perpendicular to the spanwise axis.

6. The flexure strap according to claim 5, wherein the center web does not exceed fifteen percent (15%) of the total thickness of the elongated mid portion of the flexure strap.

7. The flexure strap according to claim 1, wherein the composite matrix material comprises fiberglass with an epoxy matrix.

8. The flexure strap according to claim 1, wherein the inboard end portion includes a pair of separate, inboard ends, with each inboard end extending away from the remaining inboard end in both the vertical and horizontal directions as each inboard end extends into engagement with the rotary hub.

9. The flexure strap according to claim 8, wherein a center web of fiberglass material extends between each of the inboard ends to reinforce the inboard end portion of the flexure strap.

10. The flexure strap according to claim 1, wherein the outboard end portion has a wedge-shaped configuration that is both thicker and wider than the elongated mid portion.

11. The flexure strap according to claim 10, wherein the elongated mid portion has a rectangular cross-sectional configuration which is of less thickness than the thickness of the wedge-shaped outboard end portion, whereby the flexure strap is contoured to increase in thickness and width as the distance from the rotary hub assembly increases.

12. The flexure strap according to claim 1, wherein the means for preventing delamination comprises a length of fiberglass cloth wrapped around the elongated mid portion, with the cloth fibers extending substantially perpendicular to the spanwise axis of the flexure strap.

13. The flexure strap according to claim 1, wherein a bumper is mounted on the elongated mid portion to prevent excessive vibration of the flexure strap.

14. An improved system for joining a helicopter rotary hub assembly to a plurality of separate helicopter rotor blades, comprising:

a plurality of separate flexure straps, with each flexure strap joined at one end to the rotary hub assembly and at an opposite end to a respective one of the rotor blades;

a separate pitch case surrounding each of the flexure straps, with one end of the pitch case connected to the rotary hub assembly and an opposite end connected to a respective rotor blade;

wherein each flexure strap is formed of a composite matrix material having a first group of fibers extending substantially parallel to the spanwise axis of the flexure strap and having a second group of fibers extending at an angle to the spanwise axis of the flexure strap; and means mounted on each flexure strap for preventing delamination of the fibers forming the flexure strap as the strap is subjected to forces during operation of the helicopter.

15. The rotary system according to claim 14, wherein the means mounted on each flexure strap comprises a length of fiberglass cloth wrapped around an elongated mid portion of the flexure strap and a separate length of fiberglass cloth wrapped about each of two inboard ends of the flexure strap.

16. The rotary system according to claim 15, wherein one of the inboard ends extends in a vertically upward direction while the other inboard end extends in a vertically downward direction, with inboard ends of remotely positioned flexure straps extending into overlapping position to one another within the rotary hub assembly.

17. An improved connecting assembly for use in joining a helicopter rotary hub assembly to a plurality of rotor blades, comprising:

a plurality of flexure straps each having an inboard end portion connected to the rotary hub assembly and an outboard end portion connected to a different rotor blade and each flexure strap further including an elongated mid portion having a rectangular cross-sectional configuration extending between the inboard and outboard end portions;

wherein each of the flexure straps is formed with upper and bottom halves and a center web portion extending therebetween, with each half and the center web being formed of composite matrix fiberglass material;

wherein the fiberglass forming each flexure strap includes a first group of fibers extending parallel to the spanwise axis of the flexure strap and a second group of fibers extending at an angle to the spanwise axis; and a length of fiberglass cloth wrapped about the elongated mid portion of each flexure strap with fibers extending substantially perpendicular to the flexure strap fibers to prevent delamination of the flexure strap during helicopter operation.

18. The connecting assembly according to claim 17, wherein a separate pitch case surrounds each of the flexure straps, with one end of the pitch case connected to the rotary hub assembly and the opposite end of each pitch case connected to a respective rotor blade.

19. The connecting assembly according to claim 18 flexure straps positioned on opposite sides of the hub assembly from each other have inboard ends overlap one another within the rotary hub assembly, with each pair of overlapping inboard ends joined to one another and to the rotary hub assembly by a single pin and bolt assembly.

20. The connecting assembly according to claim 19, wherein each of the inboard ends includes an opening having a bushing through which the single pin extends, wherein each opening further includes a triangularly-shaped portion filled with a highly compressive adhesive material.

* * * * *